(12) United States Patent
Taguchi (10) Patent No.: US 6,335,984 B1
(45) Date of Patent: Jan. 1, 2002

(54) IMAGE PROCESSING METHOD AND APPARATUS FOR MULTIPLE SPECTRUM IMAGE DATA

(75) Inventor: Jun'ichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/198,335

(22) Filed: Nov. 24, 1998

(30) Foreign Application Priority Data

Nov. 25, 1997 (JP) .............................................. 9-322589

(51) Int. Cl.⁷ ................................................. G06K 9/00
(52) U.S. Cl. ........................................ 382/162; 356/318
(58) Field of Search ................................. 382/162–167, 382/168, 169, 170, 171; 356/201, 202, 203, 76, 77, 78, 318, 319, 50, 51, 52; 358/417–425

(56) References Cited

U.S. PATENT DOCUMENTS 3,664,248 A * 5/1972 Mueller .......................... 95/12
3,829,222 A * 8/1974 Aslund ......................... 356/203
5,949,055 A * 9/1999 Fleet et al. .................. 235/469

* cited by examiner

Primary Examiner—Phuoc Tran
Assistant Examiner—Amir Alavi
(74) Attorney, Agent, or Firm—Antonelli, Terry, Stout & Kraus, LLP (57) ABSTRACT

There are formed three kinds of virtual spectrum aperture images in which a weight is added to each spectrum channel image of multiple spectrum data, three kinds of characteristic virtual spectrum aperture images are allocated to RGB (red, green, blue) and a color synthesized image is displayed. A line spectrum image of a designated line of the displayed color synthesized image is displayed, and a spectrum of a designated point is further displayed. A user is able to select whether the spectrum that is once displayed should be left or deleted. When the displayed spectrum should be left, such displayed spectrum is superimposed upon a spectrum of the next selected point. Also, spectrums of points in the designated range are sequentially displayed in a cinema fashion.

19 Claims, 6 Drawing Sheets

IMAGE PROCESSING METHOD AND APPARATUS FOR MULTIPLE SPECTRUM IMAGE DATA

BACKGROUND OF THE INVENTION

The present invention relates to a multiple spectrum image processing method, and particularly to method of and apparatus for processing image data obtained when colors of respective points on an image such as the surface of the earth are spectrum-decomposed to provide color bands of multiple channels.

A certain kind of artificial satellite, for example, takes photographs of the surface of the earth and successively transmits image data of such photographs to the earth. On the earth, it is possible to learn the states of the trees and the crops on the pictures by spectrum-decomposing an enormous amount of received image data.

As such image processing apparatus, there is commercially available an image processing program product manufactured and distributed under trade name "ENVI" by Research Systems, Inc. in USA. Although "ENVI" is the program product including a variety of functions concerning image processing, with respect to the image processing concerning the spectrum analysis which is related to the present invention, a spectrum plot function is described in 4-4 to 4-14 of Version 2 of user's guide and a color synthesis and display function is described in 4-20 to 4-25.

According to the plot function of "ENVI", a spectrum of a spot designated by a user on the image is displayed. When the user designates a desired spectrum channel on the designated spectrum, an image of a spectrum channel is selected from image data comprised of images of multiple spectrum channels and displayed.

According to the color synthesizing function of "ENVI", there is obtained a color synthesized image by allocating R (Red), G (Green) and B (Blue) to images of multiple spectrum channels containing channels of visible light region and channels of infrared region. However, the user is not able to arbitrarily add weights of RGB characteristics to individual spectrum channel images. As a result, it is difficult to create a color synthesized image with a high S/N (signal-to-noise ratio) in which a user's desired spectrum channel is emphasized. Further, the color synthesizing function of "ENVI" does not have a function to use a color synthesized image obtained by allocating RGB for a variety of analyses.

SUMMARY OF THE INVENTION

It is an object of the present invention to provide image data processing method and apparatus in which a variety of spectrum analyses may be carried out by using a color image obtained on the basis of multiple spectrum channel images.

In order to attain the above-described object, according to the present invention, RGB are allocated to multiple channel spectrum images including a visible light region and an infrared region. An R image (hereinafter referred to as "R virtual spectrum aperture image") is obtained by adding weights of center, width and intensity characteristics of R to every spectrum channel of the portion to which R is allocated. Similarly, a G image (hereinafter referred to as "G virtual spectrum aperture image") is obtained by adding weights of center, width and intensity characteristics of G to every spectrum channel of the portion to which G is allocated. A B image (hereinafter referred to as "B virtual spectrum aperture imaged") is obtained by adding weights of center, width and intensity characteristics of B to the portion to which B is allocated. A color synthesized image (hereinafter referred to as "RGB image") is obtained by synthesizing the three kinds of virtual spectrum aperture images.

When this RGB image is displayed on a display apparatus and a user draws a desired line on the displayed RGB image, spectrum groups obtained at a plurality of points comprising such line are displayed on another display area on the display apparatus. Further, when the user draws a line such that the line crosses a line on the RGB image or that the line becomes parallel to the channel direction on the displayed spectrum group, a spectrum of one point at which the lines cross each other is displayed on other display area on the display apparatus. Furthermore, when the user designates a desired point independently of the line crossing point, spectrums of two points are displayed on the same display area.

DESCRIPTION OF THE PREFERRED EMBODIMENT

An embodiment of the present invention will hereinafter be described with reference to the drawings.

The manner in which multiple spectrum image data, which is to be processed by the image processing apparatus according to the present invention, is received will be described with reference to FIG. 1.

Figure 1:
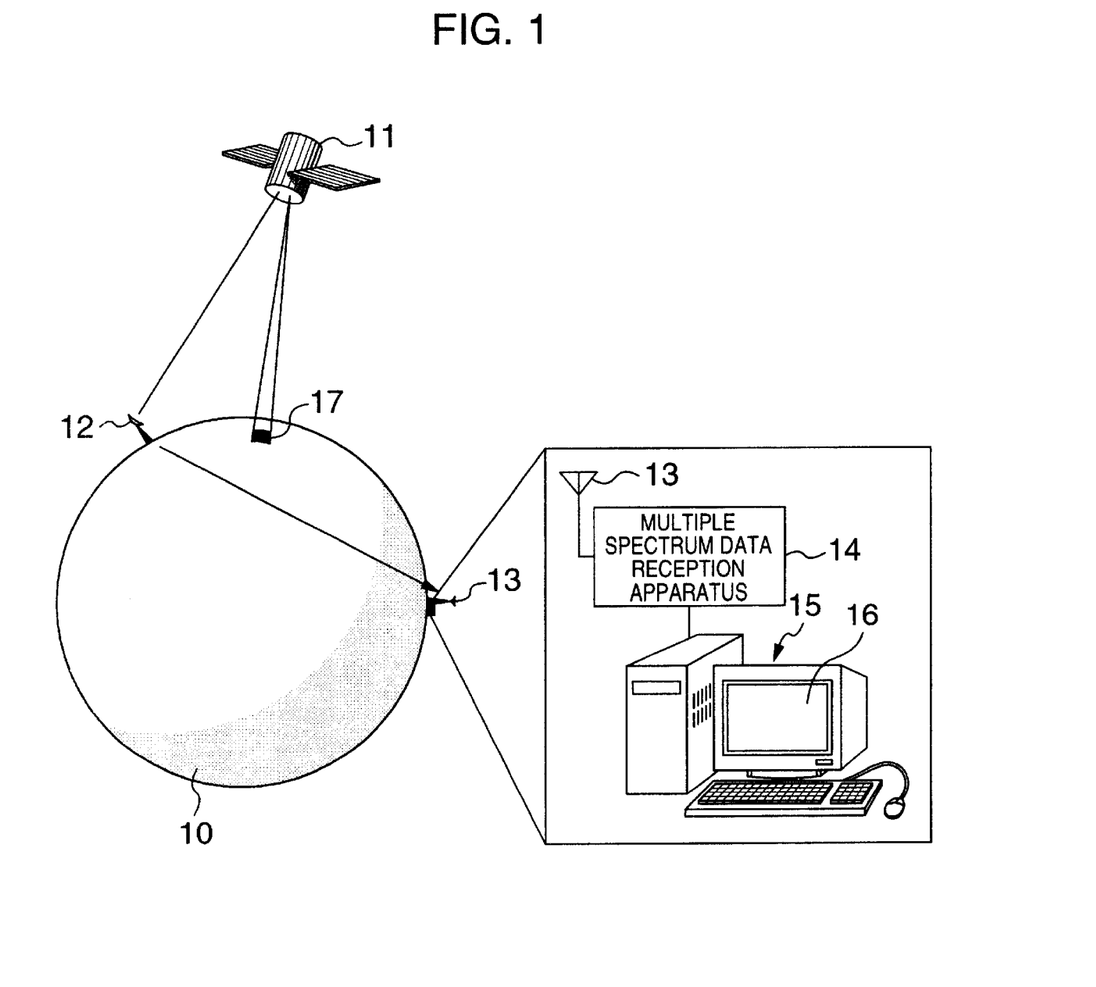
FIG. 1 is a schematic diagram showing the manner in which multiple spectrum image data, which is to be processed in the present invention, is received, and a computer system according to the present invention.

In FIG. 1, reference numeral 10 denotes the earth, reference numeral 11 denotes an artificial satellite for taking a picture of the surface of the earth 10, reference numeral 12 denotes a terrestrial station antenna for receiving multiple spectrum image data transmitted from the artificial satellite 11, reference numeral 13 denotes an antenna attached to a computer system, reference numeral 14 denotes a reception apparatus for converting the multiple spectrum image data into digital data that can be processed by a computer after the multiple spectrum image data was received at the antenna 13 from the terrestrial station antenna 12, reference numeral 15 denotes a computer system for effecting an image processing of the present invention on the digital data supplied from the reception apparatus 14, and reference numeral 16 denotes a display apparatus of the computer system 15.

When the artificial satellite 11 takes a picture of the surface 17, the artificial satellite 11 transmits image data of the surface 17 to the terrestrial station 12. When the terrestrial station 12 receives image data of a certain amount, the terrestrial station 12 transmits the image data through the antennas 12 and 13 to the computer system 15 which processes the image data. The result of the image processing is displayed on the screen of the display apparatus 16. The computer system 15 executes a variety of functions in accordance with commands entered by the user who is watching the screen of the display apparatus 16.

An outline of an image processing method executed by the computer system 15 will be described below with reference to FIG. 2.

Multiple spectrum image data of the surface 17 shot by the artificial satellite 11 is three-dimensional data obtained when colors of the earth 17 are analyzed into many (e.g. about 380) spectrum bands (channels) and spectrum channel images shot at every channel are laminated. The multiple spectrum image data may be expressed as a volume structure 20 in FIG. 2. About 380 spectrum channel images are laminated in the height direction of the volume structure 20 in FIG. 2. The spectrum channel images contain not only spectrum channel images of a visible light region A having a wavelength ranging from 380 nm to 780 nm but also spectrum channel images of a near-infrared region B having a wavelength longer than 780 nm. The channel spectrum images in the near-infrared region B cannot be confirmed visually by the user.

Therefore, according to the present invention, the computer system 15 allocates channels to the three regions of R, G, B, and forms respective virtual spectrum aperture images by effecting aperture characteristics or addition functions (21, 22 and 23) on the respective regions. To be concrete, virtual spectrum aperture images (24, 25 or 26) which well agree with man's visual sense characteristics are obtained by weighting and adding spectrum channel images within the regions in the three regions of R, G, B. An RGB image 27 is obtained by synthesizing the R, G and B virtual spectrum aperture images 24, 25 and 26 thus formed.

The RGB image 27 is an image containing spectrum channel image information (not all information but partly restrained or deleted information) and which may be visually confirmed by the user. According to the present invention, this RGB image 27 is displayed on the display apparatus 16, and the user designates a spectrum of a desired point on the basis of the RGB image 27 displayed on the display apparatus 16. For example, when the user designates a line 28 parallel to the x direction on the RGB image 27, spectrum group 29 at a plurality of points comprising the line 28 are displayed on another screen area on the display apparatus 16 with intensities corresponding to light and shade.

Multiple spectrum image data that are to be processed according to the present invention will be described with reference to the equations below.

Figure 2:
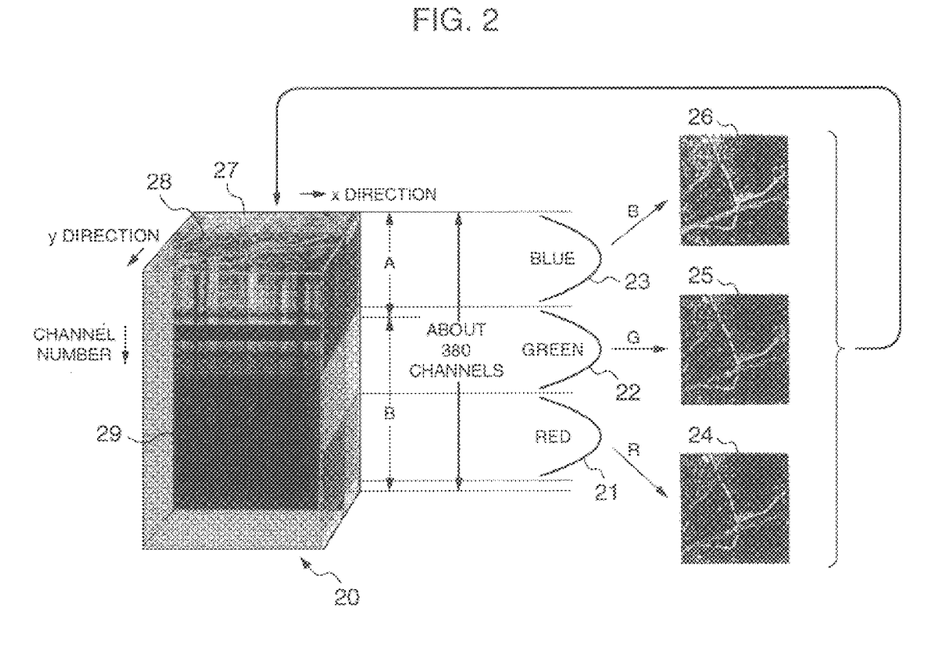
FIG. 2 is a diagram showing a concept of the present invention.

In the volume structure 20 shown in FIG. 2, a spectral intensity (data value) Vol of channel ch (depth direction) at a point (x, y) on the RGB image 27 may be described as Vol[ch][y][x]. Vol[ch1][y1][x1], for example, expresses a spectral intensity of channel ch1 at a point (x1, y1) in the volume structure 20.

A spectrum intensity Ich1[y][x] on the spectrum channel image of the channel ch1 and the spectral intensity Vol[ch][y][x] in the volume structure 20 establish the following relationship:

$$Ich[y][x]=Vol[ch1][y][x] \tag{1}$$

Specifically, if a channel is fixed to ch1, then a channel spectrum image of channel ch1 is positioned at ch1 of the depth direction in the volume structure 20.

A spectrum S[ch] at the point (x1, y1) and a spectral intensity Vol[ch][y][x] at the volume structure 20 establish the following relationship:

$$S[ch][y1][x1]=Vol[ch][y1][x1] \tag{2}$$

Specifically, if the point (x1, y1) is fixed, then the spectrum at the point (x1, y1) is expressed in the depth direction of the point (x1, y1) in the volume structure 20.

Further, a line spectrum image L[ch][x] of a horizontal line (e.g. line 28 in FIG. 2) in which the value of y-axis is y1 on the RGB image 27 and a spectral intensity Vol[ch][y][x] at the volume structure 20 establish the following relationship:

$$L[ch][x]=Vol[ch][y1][x] \tag{3}$$

Specifically, if y in the point (x, y) is fixed to y1, then the spectrum in the volume structure 20 is expressed by the spectrum group 29 in FIG. 2.

Similarly, a line spectrum image L[ch][y] of a vertical line (not used in the embodiment of the present invention) in which a value of an x-axis is x1 in the spectrum image and the spectral intensity Vol[ch][y][x] at the volume structure 20 establish the following relationship:

$$L[ch][y]=Vol[ch][y][x1] \tag{4}$$

Specifically, if x in then point (x, y) is fixed to x1, then there is represented spectrum group in which the volume structure 20 is cut along the longitudinal direction.

An image obtained by adding a proper weight f[ch] to every spectrum channel image is referred to as "virtual spectrum aperture image". A virtual spectrum aperture image G[y][x] is calculated by the following equation (5):

$$G[y][x] = \sum_{ch=1}^{n} f[ch] \cdot Vol[ch][y][x] \tag{5}$$

However, Σ in the above-mentioned equation (5) means that spectrum channel images are added in all channels ch. f[ch] is referred to as addition function. Also, f[ch] expresses the weight of addition, and hence it is referred to as addition weight. Incidentally, the virtual spectrum image may be normalized by a proper value and then displayed. A normalized value may be either Σf[ch] or a properly-designated value for convenience sake of display.

Man's retina is weighted by a proper value when analyzed by a certain spectrum. Weighting values are different in individual. According to the present invention, when there is provided a certain aperture and a color image (virtual spectrum aperture image) is formed, an addition weight of each spectrum channel image may be determined in such a manner that it becomes a predetermined distribution function which well coincides with man's visual sense characteristics.

Figure 3:
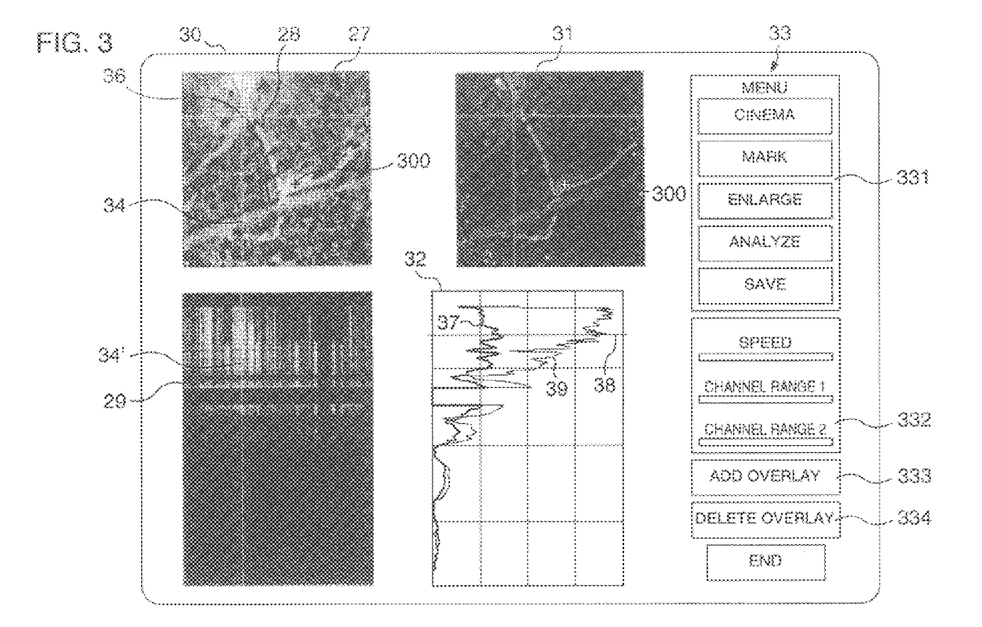
FIG. 3 is a diagram showing an example of pictures displayed on the screen of the display apparatus in the computer system shown in FIG. 1.
Figure 7:
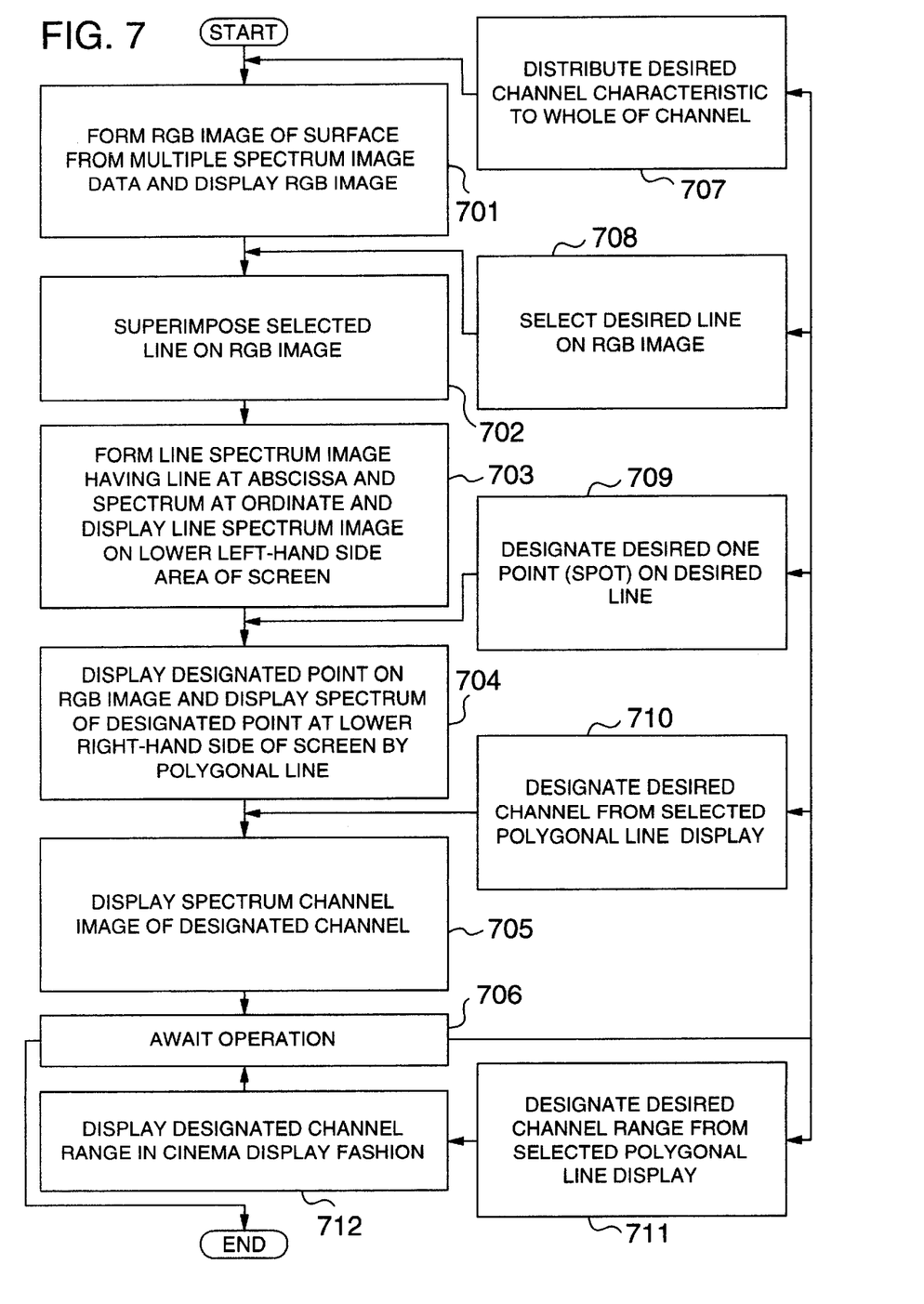
FIG. 7 is a flowchart showing a procedure of an image processing method according to the present invention.

FIG. 3 shows a screen 30 of the display apparatus 16 in the computer system 15 according to the embodiment of the present invention. FIG. 7 is a flowchart showing a procedure of displaying a picture in FIG. 3.

Here, as shown in FIG. 1, an image obtained by displaying objects of dispersed colors after the surface 17 had been shot by the artificial satellite 11 is an image to be processed.

The screen 30 comprises quadrant multi-window screens 27, 29, 31 and 32, and an operation area 33 is provided at the right-hand side of the screen 30. A procedure for displaying an image according to the present invention will be described below with reference to FIGS. 3 and 7.

Referring to FIG. 7, and following the start of operation, at a step 701, the RGB synthesized image 27 of the surface 17 is formed from multiple spectrum image data and the RGB synthesized image 27 thus formed is displayed on the display area on the left-hand side of the screen 30. There are a variety of methods for forming the RGB synthesized image of the surface 17, which will be described later on. Upon activation, a default value or a value obtained immediately before activation may be used.

In a step 702, a proper horizontal line 28 is selected on the RGB synthesized image 27 of the earth 17, and the selected line 28 is superimposed upon the color synthesized image 27. While the horizontal line 28 is selected in FIG. 3, the present invention is not limited thereto, and a longitudinal line 34 or an oblique line may be selected. Upon activation, a default value or a value obtained immediately before activation may be used.

In a step 703, with respect to the horizontal line 28 selected at the step 702, a line spectrum image 29 having the horizontal line at the abscissa and the spectrum group at the ordinate is formed and displayed on the display area at the lower right-hand side of the screen 30.

At a step 704, a proper point 36 is determined on the line spectrum image 29 displayed at the step 703 by selecting a proper vertical line 34 on the RGB image 27 displayed at the step 701 or by selecting a proper vertical line 34' on the line spectrum image 29 displayed at the step 703. The point 36 is displayed on the RGB image 27 as a crossing point of the horizontal and vertical lines 28, 34. Then, a spectrum 32 of the point 36 is displayed on the display area of the lower right-hand side of the screen 30 by a suitable form such as a polygonal line display 37 or a bar graph (line graph).

In a step 705, when a proper channel 38 is designated on the spectrum display 37 of the point 36 displayed at the step 704, a spectrum channel image 31 of the designated channel 38 is displayed on the upper right-hand display area of the screen 30 in monochrome. Upon activation, it is possible to use a default value or a value obtained immediately before activation.

After the steps 701 to 705 are ended, in a step 706, the computer system 15 is placed in the standby mode for awaiting user's operation, wherein designating conditions may be changed in response to user's operation and a displayed picture is changed.

For example, at a step 707, when the user changes the R, G and B virtual spectrum aperture images 25, 26 and 27, the RGB image 27 is updated at the step 701. At a step 708, when the user who watches the RGB image 27 selects the desired horizontal line 28, the horizontal line 28 is moved in response thereto at the step 702. In the step 703, the line spectrum image 29 corresponding to the moved horizontal line 28 is displayed in response to the movement of the horizontal line 28.

At a step 709, when the user who watches the RGB image 27 designates a desired longitudinal line 34, the longitudinal line 34 is moved at the step 704 in response thereto to determine one desired point 36 from the crossing point of the vertical and horizontal lines, and the spectrum 32 of that point 36 is displayed. At a step 710, when the user who watches the spectrum 32 of the point 36 designates a desired channel by moving the horizontal line 38, in the step 705, the spectrum channel image 31 of the desired channel is displayed on the upper right-hand display area of the screen 30.

Further, at a step 711, when the user who watches the spectrum 32 of the point 36 designates a desired channel range, it is possible to effect a cinema display based on a plurality of channel spectrum images. The cinema display is such one that a plurality of corresponding channel spectrum images are scanned by sequentially changing the channel numbers within a designated channel range. At that time, the horizontal line 38 in the lower right-hand side display area of the screen 30 is smoothly elevated and lowered, and an animation of channel spectrum image is effected on the upper right-hand side display area like cinema.

In the embodiment of the present invention, since a variety of lines such as the horizontal lines 28, 38 and the vertical lines 34, 34' may be designated and moved on the displayed picture, it is possible for the user to easily scan an enormous amount of multiple spectrum image data. This is effective for the user to detect desired image data and spectrum from an enormous amount of image data.

The operation area 33 shown in FIG. 3 shows a menu 331 having a cinema operation button, a mark operation button, an enlarge operation button, an analyze operation button and a save operation button. In FIG. 3, reference numeral 332 denotes an operation tool such as a cinema operation scan speed, a channel range 1 and a channel range 2. Reference numeral 333 denotes an overlay add button, and reference numeral 334 denotes an overlay delete button which will be described later on.

The processing procedure of each operation step in FIG. 7 has been described so far with reference to FIG. 3. The RGB image 27 is an image used for reference to form the line spectrum image by determining the horizontal line 28, and may be referred to as "reference image". While the RGB image 27 is used as the reference image as described above, the present invention is not limited thereto, and a spectrum channel image and a virtual spectrum aperture image also may be used as the reference image.

Figure 4:
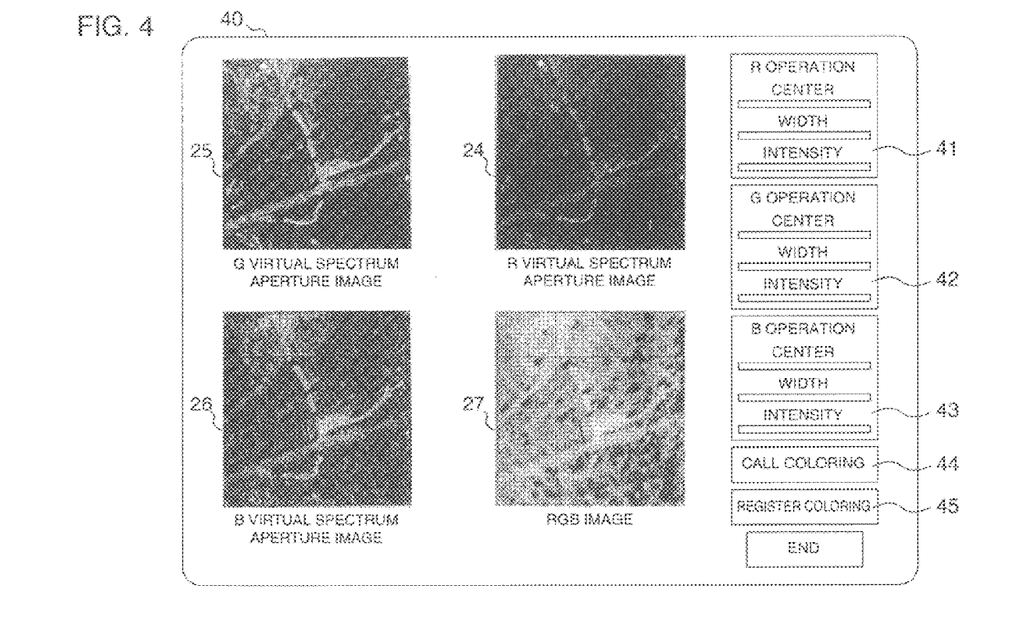
FIG. 4 is a diagram showing the manner in which an RGB image is formed on the screen of the display apparatus in the computer system shown in FIG. 1.

FIG. 4 is a diagram showing a screen on which the RGB image 27, which is the color synthesized image, is formed.

The RGB image 27 may form a variety of images with different contrasts. In the equation (5), for example, there are formed three kinds of virtual spectrum aperture images 24, 25, 26 in which the addition function f[ch] is changed. Then, an RGB image 27 may be obtained by allocating the respective virtual spectrum images to the respective R, G, B (red, green, blue).

If the addition function f[ch] is arranged as a function matched with human spectrum sensing ratio of each of R, G, B, then a resultant RGB image becomes an image which is similar to a picture obtained when a user watches the same.

If the user properly changes the addition function f[ch] obtained when RGB virtual spectrum aperture images are formed in order to change a contrast of a resultant virtual spectrum aperture image, then it is possible to form a variety of RGB images with proper contrasts.

Figure 5:
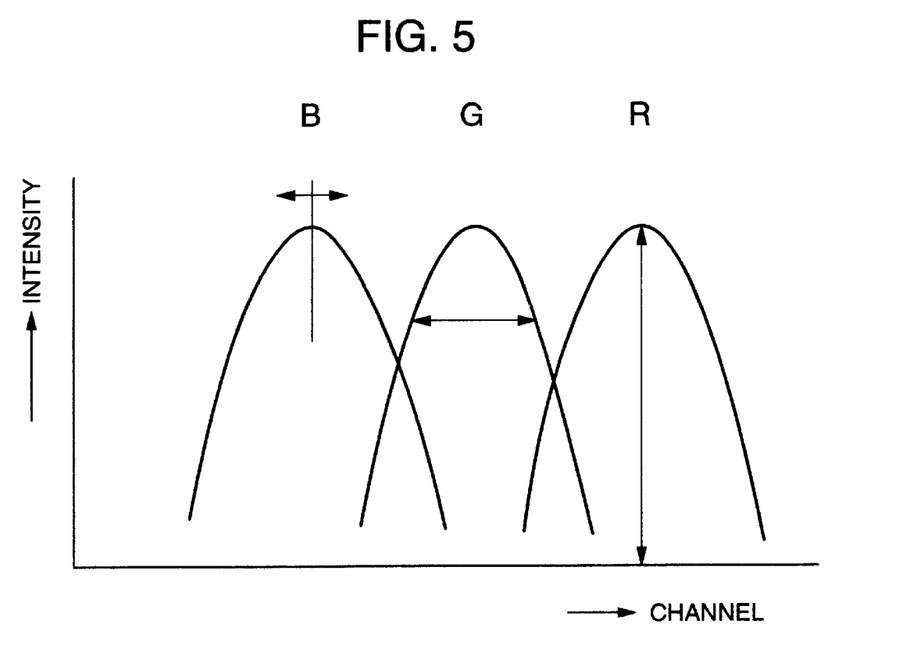
FIG. 5 is a diagram showing an example of the manner in which RGB weighting characteristics are allocated in order to obtain the RGB virtual spectrum aperture image shown in FIG. 4.
Figure 6:
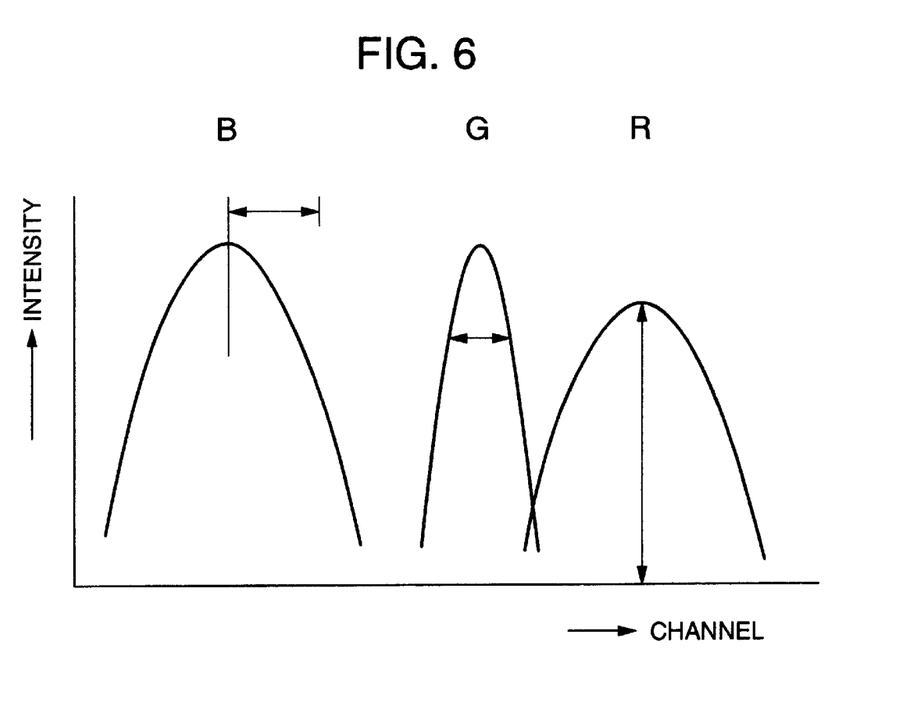
FIG. 6 is a diagram showing another example of the manner in which RGB weighting characteristics are allocated in order to obtain the RGB virtual spectrum aperture image shown in FIG. 4.

FIG. 5 is a diagram showing the manner in which RGB are allocated to the channel and showing an example of weight for forming the RGB image 27. FIG. 6 is a diagram showing the manner in which RGB are allocated to the channel and showing another example of weight for forming the RGB image 27. FIGS. 5 and 6 show examples of addition functions of RGB. In the case of FIG. 5, the addition functions allocated to the respective colors have the same, wide bandwidth , the resultant RGB image 27 properly and equally contains respective spectrum channels and becomes an image with a high S/N. On the other hand, in the case of FIG. 6, the addition functions of RGB are made different. As compared with FIG. 5, the addition function of B has the center moved in the left-hand side, the addition function of G has a narrow bandwidth, and the addition function of R has a lowered intensity. Although the S/N of the resultant RGB image is low, if a characteristic proper band is selected, then the resultant RGB image 27 becomes a characteristic image of each color.

In order to make the RGB image 27 become a distinctive image with an excellent contrast, it is necessary that virtual spectrum aperture images 24 to 26 allocated to the respective R, G, B colors become distinctive images, respectively. Therefore, the adjustment of the respective addition functions becomes important.

FIG. 4 is a diagram showing a graphic user interface screen 40 used to form the distinctive RGB image 27 by properly adjusting the addition functions for forming the virtual spectrum aperture images 24, 25, 26 allocated to the RGB. The user is able to designate the center position, the bandwidth and the whole intensity of the RGB of the addition function (distribution function) shown in FIGS. 5 and 6 by tool bars 41, 42 and 43. Then, the resultant virtual spectrum aperture images 24, 25, 26 are displayed respectively. In this manner, the user may form desired virtual spectrum aperture images and the user is able to make a resultant RGB image 27 become a desired one interactively.

Accordingly, in the menu shown in FIG. 4, as the tool bars 41, 42, 43 for adjusting the weights required when the respective channel spectrum images are added, there are prepared a tool bar for sliding the central spectrum position of the spectrum weight addition, a tool bar for determining the whole width of the added weight distribution and a tool bar for determining the whole intensity of added weight distribution. Thus, the user may form a virtual spectrum image with a desired contrast interactively.

Incidentally, as a method of generating addition functions from the function center position, the bandwidth and the whole intensity, a standard deviation may be provided as a value for determining a bandwidth by using a Gaussian function or a standard deviation may be calculated based on a proper temple bell-like function.

In addition, an image in which a spatial change of spectrum is emphasized may be formed and used as the RGB image 27.

While the RGB image 27 is used as the reference image as described above, a color image, in particular, need not be formed so long as the image is used only as the reference image. For example, one kind of virtual spectrum image may be used as the reference image. Also, in order to designate the line spectrum image, a predetermined spectrum channel image may be used as the reference image.

Further, while the line spectrum image 29 is an image which results from arraying spectrums of a plurality of points comprising one horizontal line 28 as described above, line spectrum images of other lines may be sequentially displayed on the same picture display region in an animation fashion (i.e. cinema fashion) by scanning the horizontal lines upwardly or downwardly, thereby making it possible for the user to watch the changes with ease.

In the case of FIG. 3, for example, as the reference image of the RGB image 27, there are displayed an upper limit and a lower limit of the horizontal line interval which is displayed on the reference image in a cinema fashion. The horizontal line position 28 of the line spectrum image that is now being displayed in a cinema fashion may be sequentially displayed in a cinema fashion by scanning the horizontal line from the upper limit to the lower limit or vice versa.

Further, the spectrum of the designated point also may be displayed in a cinema fashion while the displayed position is changed sequentially. For example, in the case of FIG. 3, the line spectrum image 29 is used as the reference image, the left end and the right end of the point that is displayed in a cinema fashion are displayed on the reference image, and the spectrum 37 may be sequentially displayed by scanning the longitudinal line from left to right or vice versa in a cinema fashion while the point 34' of the spectrum that is now being displayed in a cinema fashion.

In the embodiment shown in FIG. 3, spectrums of a plurality of designated points may be displayed in an overlay fashion.

That is, in FIG. 3, the user may designate at least one reference point 300 on the RGB image (or virtual spectrum aperture image). The spectrum of the designated reference point is additionally displayed on the display region 32 as a spectrum 39. This will hereinafter be described in detail with reference to FIG. 3.

The user selects a desired reference point from the RGB image (or virtual spectrum aperture image) 27. When the user selects the reference point 1 (300), the spectrum 39 of the corresponding reference point 1 (300) is displayed in addition to the spectrum 37 of the point 36. When the user designates a proper channel 38 of the spectrum 39, the spectrum channel image 31 of the designated channel 38 may be displayed. When the user wants to further add the spectrums in an overlay fashion, a desired reference point is selected on the RGB image (or virtual spectrum aperture image) 27. When the user selects a reference point 2 (not shown), for example, a spectrum (not shown) of the reference point 2 is displayed on the display region 32 in an overlay fashion.

Similarly, the points that were sequentially displayed and designated in an overlay fashion may be selected and displayed in an overlay fashion. When the user wants to delete the overlaid spectrum, the user places the apparatus in the overlay delete mode by depressing an overlay delete button 334 provided on the lower right-hand side of the screen, designates a deleted spectrum or reference point, and deletes the same. When the user wants to add the overlay display of the spectrum one more time, the user places the apparatus in the overlay add mode by depressing an overlay add button 333 provided on the lower right-hand side of the screen, similarly selects a reference point to which a spectrum is to be added, and displays the spectrum in an overlay display fashion. The spectrum 39 of the reference point 300 is used as a comparison target of the spectrum 37 by calculating a correlation between the spectrum 39 and the spectrum 37 of the point 36 selected by the user, for example.

While the displayed spectrums 37 and 39 are sequentially overlaid as described above, whether or not the displayed spectrum should be left as an overlay spectrum may be selected and only a desired spectrum may be left. Also, while the reference point at which the spectrums are displayed in an overlay fashion is selected by the RGB image (or virtual spectrum aperture image) 27 as described above, such reference point may be selected by the point on the spectrum channel image 31 of the designated channel. Furthermore, the designated position may be displayed in such a manner that the corresponding designated positions of the designated channel 38, the spectrum channel image 31 and the virtual spectrum aperture image 27 may be learned.

In addition, the user may set a desired line (line direction may be arbitrary) on the RGB image (or virtual spectrum aperture image) 27 and spectrums of the point on that line may be sequentially displayed in a cinema fashion. In that case, the past spectrum may be displayed with a low contrast or may be displayed with a high contrast by a currently-displayed spectrum color. Further, spectrums distant from the point of the spectrum that is now being displayed may be progressively displayed with a low contrast and may be progressively colored with a low contrast.

While the embodiment of the present invention has been described so far with reference to FIG. 3, the present invention is not limited thereto, and with respect to the spectrum 37 of the designated point, a function for selectively leaving a desired spectrum is added to the display region 32 so that such desired spectrum may be displayed together with a spectrum of a newly designated point in an overlay fashion.

Furthermore, instead of the spectrum channel image 31 of the designated channel displayed on the upper right-hand side display region in FIG. 3, for example, there may be displayed a proper distinctive image. For example, there may be displayed an image in which a value obtained by calculating a correlation of predetermined spectrums of respective points is used as a pixel value. Furthermore, for example, a portion having a large spectrum absorption of each point may be detected, an expected absorption spectrum may be obtained by calculating a difference between a filter spectrum obtained by a proper filtering in the spectrum direction and an original spectrum, whereby an image of an absorption spectrum of a predetermined channel may be displayed. Moreover, a correlation between the predetermined absorption spectrum and an absorption spectrum of each pixel may be calculated, and an image in which its correlation value is used as a pixel value may be displayed. That is, the reason that reflected light looks bluish is that other wavelengths are absorbed by the atmosphere. Also, since an absorption degree is different in response to a substance, a filter spectrum is formed by applying a filter coincident with each substance to the filter direction, and the above-mentioned processing is executed.

If each step for executing the image processing of the above-mentioned embodiment is converted into a program and the converted program is stored in a recording medium, then the user is able to process multiple spectrum image data at any place in which the user carries such recording medium according to the present invention. Accordingly, it is possible to form a distinctive color image with a high S/N. Furthermore, spectrums at different places may be compared with each other easily.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An image processing method of processing a number of image data for an objective taken by using chromatic spectrum channels which are obtained by spectrum-decomposing colors, said image processing method comprising the steps of:
   determining an aperture characteristic of a virtual spectrum aperture for a predetermined channel range within said chromatic spectrum channels by adding predetermined weights to respective image data in said predetermined channel range; and
   displaying an image of said objective based on the image data respectively weighted by said virtual spectrum aperture.

2. An image processing method for multiple spectrum image data according to claim 1, further comprising the step of providing a tool bar for adjusting weights by which predetermined spectrum channel images are added when said virtual spectrum aperture images are formed and wherein virtual spectrum aperture images obtained by adding each spectrum image with weights designated by said tool bar, and said tool bar is adjusted in response to said displayed result such that desired virtual spectrum aperture images may be formed.

3. An image processing method for multiple spectrum image data as claimed in claim 2, wherein said tool bar for adjusting weights to add said predetermined spectrum channel images comprises a first tool bar for sliding a central spectrum position of weight addition of spectrum and a second tool bar for determining a whole width of said addition weight distribution.

4. An image processing method for multiple spectrum image data as claimed in claim 1, wherein an image obtained after each spectrum channel image of said virtual spectrum aperture images was added by a predetermined weight is colored as an R (red) image, an image obtained after each spectrum channel image was added by another predetermined weight is colored as a G (green) image, an image obtained after each spectrum channel image was added by other predetermined weight is colored as a B (blue) image, addition weights of each spectrum channel images allocated to said R image, said G image and said B image are determined such that said addition weights become distribution functions matched with human visual sense characteristics and images of said respective colors are displayed in color.

5. An image processing method of processing a number of image data for an objective taken by using chromatic spectrum channels which are obtained by spectrum-decomposing colors, said image processing method comprising the steps of:
   determining a line across said objective to obtain a graphical image re-presenting image data along said line, said graphical image having one axis for said line and another axis for said chromatic spectrum channels;
   displaying said graphical image; obtaining graphical image representing image data along lines for a distance ranging from said line to another line; and
   continuously and sequentially displaying said graphical images thus obtained in a cinema fashion.

6. An image processing method for multiple spectrum image data as claimed in claim 5, wherein a virtual spectrum aperture image obtained by adding spectrum images with predetermined weights or a color image obtained by coloring three kinds of virtual spectrum aperture images is used as a reference image, an upper limit and a lower limit of line interval for displaying each line spectrum image in a cinema fashion are displayed on said reference image, and a line position of the line spectrum image which is displayed at present in a cinema fashion is displayed on said reference image.

7. An image processing method of processing a number of image data for an objective taken by using chromatic spectrum channels which are obtained by spectrum-decomposing colors, said image processing method comprising the steps of:
   using an image of said objective weighted by a virtual spectrum aperture which is obtained by adding image data of predetermined chromatic spectrum channels with predetermined weights or a color-synthesized image of said objective obtained by coloring three virtual spectrum apertures obtained based on image data of said chromatic spectrum channels as a reference image; and
   determining a line across said reference image and displaying a graphical image representing image data along said line, said graphical image having one axis for said line and another axis for said chromatic spectrum channels.

8. An image processing method for multiple spectrum image data as claimed in claim 7, wherein when a desired point of said line spectrum image is designated, such designated point is displayed on said reference image and a spectrum of said point is displayed, and when a proper channel of said displayed spectrum is designated, a spectrum channel image of said channel is displayed.

9. An image processing method of processing a number of image data for an objective taken by using chromatic spectrum channels which are obtained by spectrum-decomposing colors, said image processing method comprising the steps of:

using an image of said objective weighted by a virtual spectrum aperture which is obtained by adding image data of predetermined chromatic spectrum channels with predetermined weights or a color-synthesized image of said objective obtained by coloring three virtual spectrum apertures obtained based on image data of said chromatic spectrum channels as a reference image;

determining one point on said reference image and displaying a graphical image representing image data at said one point;

selecting another point on said reference image by image adding means to obtain another graphic image representing image data at said another point;

displaying graphic images at said one point and said another point in a superimposed fashion;

designating a point on said reference image or a graphic image in order to indicate an undesired graphic image; and deleting both of a graphic image being displayed and display of a point on said reference image by image deleting means.

10. An image processing method for multiple spectrum image data according to claim 1, further comprising the steps of:

forming a color synthesized image by synthesizing said virtual spectrum aperture images of a plurality of colors;

displaying said color synthesized image on a screen of a display apparatus as a reference image; and displaying line spectrum images of a plurality of points designated on said displayed reference image on another display region of said screen.

11. An image processing method for multiple spectrum image data according to claim 10, further comprising the step of displaying a channel spectrum of one point designated on said displayed line spectrum image on other display region of said screen.

12. An image processing method for multiple spectrum image data according to claim 11, further comprising the step of displaying a channel spectrum image of a channel designated on said displayed channel spectrum on other display region of said screen.

13. An image processing method for multiple spectrum image data according to claim 12, further comprising the step of displaying an animation of a channel spectrum image by scanning two channels designated on said displayed channel spectrum.

14. A image processing apparatus comprising:

a reception unit for receiving a number of image data for an objective taken by using chromatic spectrum channels which are obtained by spectrum-decomposing colors;

an image processing unit for creating an aperture characteristic of a virtual spectrum aperture for a predetermined channel range within said chromatic spectrum channels by adding predetermined weights to respective image data in said predetermined channel range with respect to each of plural colors, forming an image of said objective based on the image data respectively weighted by said virtual spectrum aperture with respect to each of said plural colors, and forming a color synthesized image by synthesizing said images with respect to plural colors; and a display apparatus for displaying said color synthesized image as a reference image in a predetermined region on a screen, wherein said image processing unit displays, in another region on said screen, a graphical image representing image data at a point designated on said reference image displayed on said screen.

15. A multiple spectrum image processing apparatus as claimed in claim 14, wherein said image processing unit displays a line spectrum image of a plurality of points designated by a line on said displayed reference image on another display region of said screen.

16. A multiple spectrum image processing apparatus as claimed in claim 15, wherein said image processing unit displays a channel spectrum of one point designated on said displayed line spectrum image on other display region of said screen.

17. A multiple spectrum image processing apparatus as claimed in claim 16, wherein said image processing unit displays a channel spectrum image of a channel designated on said displayed channel spectrum on other display region of said screen.

18. A multiple spectrum image processing apparatus as claimed in claim 17, wherein said image processing unit displays an animation of a channel spectrum image by scanning two channels designated on said displayed channel spectrum.

19. A computer program product for use in an image processing apparatus, comprising:

an image processing unit for forming, based on a number of image data for an objective taken by using chromatic spectrum channels which are obtained by spectrum-decomposing colors, an aperture characteristic of a virtual spectrum aperture for a predetermined channel range within said chromatic spectrum channels by adding predetermined weights to respective image data in said predetermined channel range with respect to each of plural colors, and forming an image of said objective based on the image data respectively weighted by said virtual spectrum aperture with respect to each of said plural colors;

a processing unit for forming a color synthesized image by synthesizing said images with respect to said plural colors, and displaying said color synthesized image in a predetermined region on a screen of a display apparatus as a reference image; and a processing unit for displaying, in another region on said screen, a graphical image representing image data at a point designated on said reference image displayed on said screen.

* * * * *